United States Patent
Yoon et al.

(10) Patent No.: US 9,348,521 B2
(45) Date of Patent: May 24, 2016

(54) SEMICONDUCTOR STORAGE DEVICE AND METHOD OF THROTTLING PERFORMANCE OF THE SAME

(71) Applicant: Samsung Electronics Co., Ltd., Suwon-si, Gyeonggi-do (KR)

(72) Inventors: Han-Bin Yoon, Hwaseong-si (KR); Yeong-jae Woo, Guri-si (KR); Dong-gi Lee, Yongin-si (KR); Kwang-Ho Kim, Hwaseong-si (KR); Hyuck-Sun Kwon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 67 days.

(21) Appl. No.: 14/504,568

(22) Filed: Oct. 2, 2014

(65) Prior Publication Data

US 2015/0019801 A1 Jan. 15, 2015

Related U.S. Application Data

(63) Continuation of application No. 13/166,216, filed on Jun. 22, 2011, now Pat. No. 8,856,424.

(30) Foreign Application Priority Data

Aug. 20, 2010 (KR) .................. 10-2010-0080697
Aug. 20, 2010 (KR) .................. 10-2010-0080698
Aug. 20, 2010 (KR) .................. 10-2010-0080699

(51) Int. Cl.
*G06F 12/00* (2006.01)
*G06F 3/06* (2006.01)
*G06F 13/16* (2006.01)

(52) U.S. Cl.
CPC ............ *G06F 3/0616* (2013.01); *G06F 3/0613* (2013.01); *G06F 3/0653* (2013.01); *G06F 3/0659* (2013.01); *G06F 3/0679* (2013.01); *G06F 13/1668* (2013.01); *G06F 2206/1014* (2013.01)

(58) Field of Classification Search
CPC . G06F 12/0246; G06F 3/0679; G06F 3/0688; G06F 2212/7203; G06F 11/108; G06F 2206/1014; G06F 3/0616; G06F 3/0653
USPC .................................................. 711/103, 167
See application file for complete search history.

(56) References Cited

U.S. PATENT DOCUMENTS

| | | |
|---|---|---|
| 2008/0126720 A1 | 5/2008 | Danilak |
| 2008/0126891 A1 | 5/2008 | Danilak |
| 2008/0228992 A1 | 9/2008 | Dumitru et al. |
| 2008/0276238 A1* | 11/2008 | Levanoni et al. ............. 718/100 |
| 2009/0138671 A1 | 5/2009 | Danilak |
| 2010/0017556 A1* | 1/2010 | Chin et al. .................... 711/103 |
| 2012/0011301 A1* | 1/2012 | Goss et al. .................... 711/103 |

* cited by examiner

*Primary Examiner* — Jasmine Song
(74) *Attorney, Agent, or Firm* — Harness, Dickey & Pierce

(57) ABSTRACT

A semiconductor storage device and a method of throttling performance of the same are provided. The semiconductor storage device includes a non-volatile memory device; and a controller configured to receive a write command from a host and program write data received from the host to the non-volatile memory device in response to the write command. The controller inserts idle time after receiving the write data from the host and/or after programming the write data to the non-volatile memory device.

30 Claims, 16 Drawing Sheets

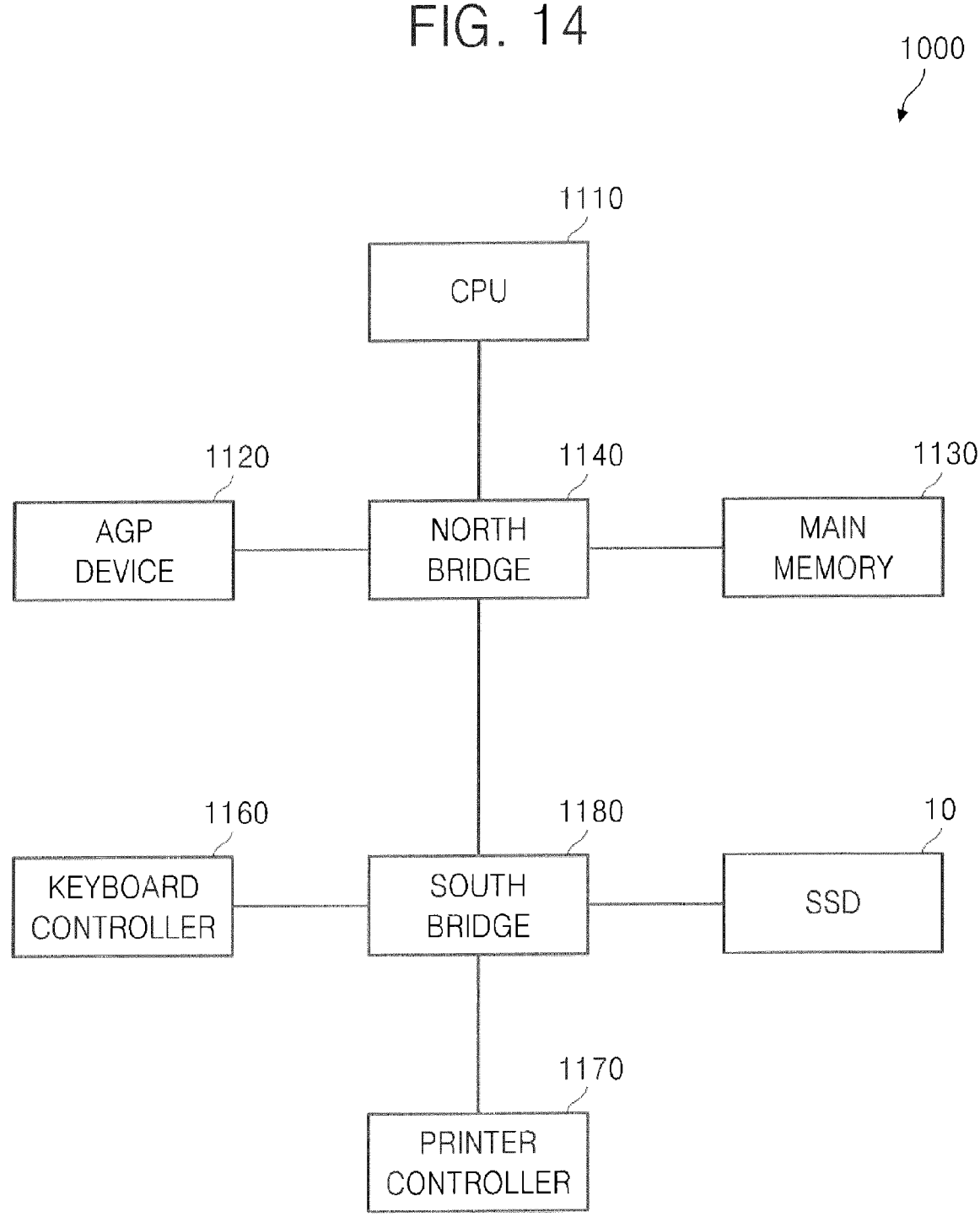

SEMICONDUCTOR STORAGE DEVICE AND METHOD OF THROTTLING PERFORMANCE OF THE SAME

CROSS-REFERENCE TO RELATED APPLICATIONS

This application is a Continuation Application of prior application Ser. No. 13/166,216, filed on Jun. 22, 2011 in the United States Patent and Trademark Office, which claims priority under 35 U.S.C. §119(e) to Korean Patent Application No. 10-2010-0080698 filed on Aug. 20, 2010, in the Korean Intellectual Property Office, the benefit of Korean Patent Application No. 10-2010-0080697 filed on Aug. 20, 2010, in the Korean Intellectual Property Office, and the benefit of Korean Patent Application No. 10-2010-0080699 filed on Aug. 20, 2010, in the Korean Intellectual Property Office, the disclosures of which are incorporated herein by reference.

BACKGROUND

1. Field of the Invention

The present inventive concept relates to a data storage device, and more particularly, to a semiconductor storage device to store data in non-volatile memory and a method of throttling the performance of the semiconductor storage device.

2. Background of the Invention

Semiconductor storage devices, which store data using a semiconductor device, especially, a non-volatile memory device, are advantageous in that they are fast, robust to physical shock, generate a small amount of heat or noise, and can be miniaturized compared to disk storage media, i.e., hard disk drives that have been widely used as large-capacity storage devices.

Meanwhile, semiconductor storage devices may have a limited life. For instance, a NAND flash memory device is divided into blocks each of which includes a plurality of pages. When a NAND flash memory device is used, a block is erased and then the pages in the block are sequentially programmed with data. To program with new data the block in which all pages have been programmed, the block must be erased again. Such procedure is referred to as a program and erase (PE) cycle. In a NAND flash memory device, the number of PE cycles that a block can endure is limited, which is referred to as the endurance of the NAND flash memory device.

When the number of PE cycles experienced by a block exceeds an endurance limit, the block is more likely to operate in error afterwards. Besides program and erase operations, read operations and spontaneous charge loss may cause memory to operate in error. When the probability of erroneous operation increases, semiconductor storage devices should not be used any more for data integrity. Therefore, semiconductor storage devices using a NAND flash memory device have a limit to the life.

In the above example, when excessive workloads, for example, write operations, erase operations, and read operation, are put on semiconductor storage devices, the life thereof may be shortened or the expected life may not be ensured. To ensure the expected life of semiconductor storage devices, therefore, it is necessary to throttle the processing performance of semiconductor storage devices according to the intensity or amount of workloads put thereon.

For instance, recently a solid state drive (SSD) has been developed including multi-level cell (MLC) NAND flash memory for server applications. Such server-bound storage devices require high performance, i.e., high input/output (I/O) per second and have the wide fluctuation of workloads. When MLC NAND flash memory with an endurance limit is used in these applications, it is difficult to guarantee the life of an SSD.

A storage device whose life needs to be guaranteed is not restricted to a server-bound storage device. The lives of storage devices to be used in personal computers (PCs), notebook computers, mobile terminals, and so on also need to be ensured.

In addition to a NAND flash memory, phase-change random access memory (PRAM), magnetic RAM (MRAM), resistive RAM (ReRAM), and ferroelectric RAM (FeRAM) are also examples of memory with the endurance limit. NAND flash memory with the endurance limit include a NAND flash memory using a floating gate and NAND flash memory using charge trap flash (CTF).

As described above, an approach to increase the life of a semiconductor storage device using non-volatile memory with an endurance limit or ensuring the expected life thereof is desired.

SUMMARY

Additional aspects and utilities of the present general inventive concept will be set forth in part in the description which follows and, in part, will be obvious from the description, or may be learned by practice of the present general inventive concept.

According to some embodiments of the present inventive concept, there is provided a method of throttling performance of a semiconductor storage device including a non-volatile memory device and a controller controlling the non-volatile memory device. The method includes comprising the operations of: (a) the controller receiving a write command from a host; (b) the controller receiving write data from the host; and (c) the controller programming the write data to the non-volatile memory device in response to the write command. And, idle time is inserted according to a predetermined performance level after at least one of operations (a) through (c).

According to some embodiments of the present inventive concept, there is provided a method of throttling performance of a semiconductor storage device including a non-volatile memory device and a controller controlling the non-volatile memory device. The method includes the operations of: (a) the controller receiving a read command from a host; (b) the controller reading read data from the non-volatile memory device in response to the read command; and (c) the controller sending the read data to the host, wherein idle time is inserted according to a predetermined performance level after at least one of operations (a) through (c).

According to some embodiments of the present inventive concept, there is provided a semiconductor storage device. The non-volatile memory device includes a non-volatile memory device; and a controller configured to receive a write command from a host and program write data received from the host to the non-volatile memory device in response to the write command. The controller inserts idle time after receiving the write data from the host and/or after programming the write data to the non-volatile memory device.

According to some embodiments of the present inventive concept, there is provided a method of throttling performance of a semiconductor storage device (SSD) including a non-volatile memory device and a controller to control the non-volatile memory device, the method including gathering workload data related to a workload of the SSD based on commands received from a host device; performing operations of the SSD corresponding to the received commands while estimating a future workload of the SSD based on the gathered workload data; determining a performance level of the operations of the SSD according to the estimated future workload of the SSD; and applying the determined performance level to next operations of the SSD.

According to an embodiment, the determined performance level is directly proportional to the estimated future workload of the SSD.

The determining the performance level of the SSD can include calculating and applying an idle time to the operations of the SSD.

The idle time can be directly proportional to the determined estimated future workload of the SSD.

The applying an idle time to the operations of the SSD can include controlling the rate at which the commands are received from the host.

The controlling the rate at which commands are received from the host can be performed by delaying sending an acknowledgement signal to the host.

According to an embodiment, generation of a predetermined idle time can be performed at each of a program operation to the non-volatile memory device, a read operation from the non-volatile memory device, a read operation from an internal buffer of the non-volatile memory device, a read operation from a buffer of the controller, and a read operation from the host.

According to an embodiment, generation of a predetermined idle time is performed at each of a program operation to the non-volatile memory device, a write operation from to an internal buffer of the non-volatile memory device, a write operation to a buffer of the controller, and a write operation to the host.

According to an embodiment, the operations of the SSD, based on commands received from the host device, include: transferring data from the host to the SSD according to the write command; storing the transferred data to the non-volatile memory device, and sending a write completion acknowledgement to the host.

According to an embodiment, the idle time is calculated based on one of counting a number of write commands that the host sends to the SSD, a number of read commands that the host sends to the SSD, an amount of data transferred to/from the host in response to a command, the amount of data received from the host in response to write commands, the amount of data transferred to the host in response to read commands, the number of program operations performed in the SSD, and the number of read operations performed in the SSD.

According to some embodiments of the present inventive concept, there is provided a semiconductor storage device (SSD), including: a non-volatile memory device; and a controller to gather workload data related to a workload on the SSD based on commands received from a host device, to perform operations of the SSD corresponding to the received commands while estimating a future workload of the SSD based on the gathered workload data, to determine a performance level of the operations of the SSD according to the estimated future workload of the SSD, and to control the performance level of the next operations of the SSD based on the determined performance level.

According to embodiments, the controller includes a workload module to gather workload data related to a workload on the non-volatile memory device, to estimate a future workload of the SSD based on the gathered workload data, and to determine a performance level of the operations of the SSD according to the estimated future workload of the SSD; and a throttling module to control the performance level of the next operations of the SSD based on the determined performance level.

The SSD may further include a cache buffer device to store write data according to write commands from the host.

According to embodiments, the write data is stored in the first buffer, and then stored in a second buffer, which is an internal buffer of the non-volatile memory device, and then stored in the non-volatile memory device before the throttling module controls the performance level of the next operations of the SSD.

According to some embodiments of the present inventive concept, there is provided a method of throttling performance of a semiconductor storage device (SSD) including a non-volatile memory device, the method including estimating a future workload of the non-volatile memory device while performing operations of the SSD corresponding to received operation commands; determining a target performance level to be applied to the SSD according to the estimated future workload of the non-volatile memory device; and applying the determined target performance level to next operations of the SSD.

According to embodiments, the estimating a future workload of the non-volatile memory device includes gathering workload data related to a workload of the non-volatile memory device based on commands received from a host device.

According to embodiments, the applying the target performance level includes inserting an idle time between at least two operations of the non-volatile memory device.

According to embodiments, the idle time may be inserted using a timer.

According to embodiments, the idle time may be applied by causing the SSD to perform a meaningless time consuming operation.

According to embodiments, an idle time is inserted between each of a program operation to the non-volatile memory device, a read operation from the non-volatile memory device, a read/write operation from/to an internal buffer of the non-volatile memory device, a read/write operation from/to a buffer of a controller of the SSD, and a read/write operation from/to a host interface.

BRIEF DESCRIPTION OF THE DRAWINGS

The above and other features and advantages of the present inventive concept will become more apparent by describing in detail exemplary embodiments thereof with reference to the attached drawings in which:

FIG. 14 shows a block diagram of a computer system having the semiconductor storage device of FIG. 1, according to an example embodiment of the present inventive concept.

DETAILED DESCRIPTION OF THE EMBODIMENTS

Figure 1:
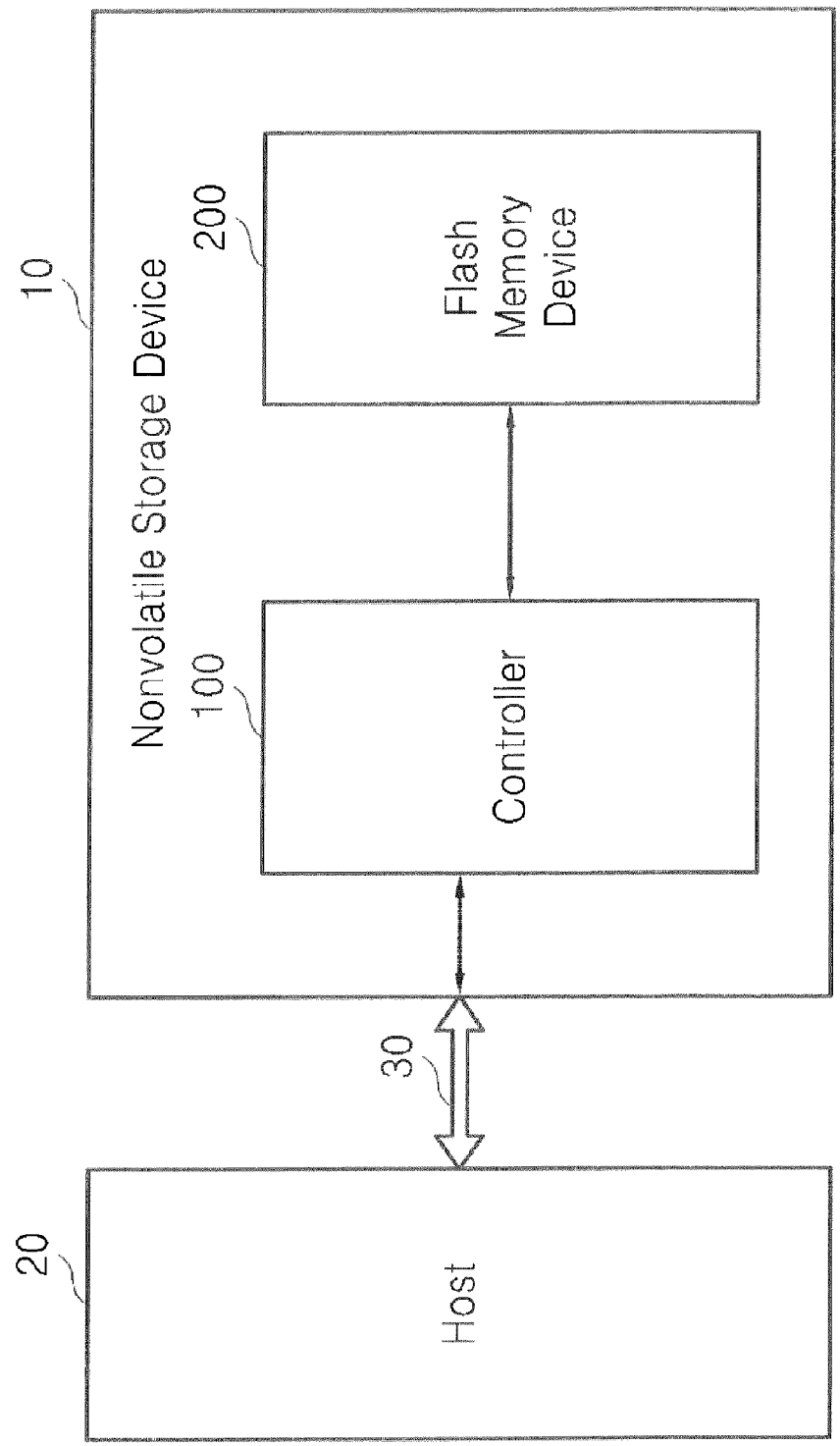
FIG. 1 is a schematic block diagram of a data storage system according to some embodiments of the present inventive concept.

The present inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The present inventive concept relates to a method of grasping and estimating workloads, i.e., the intensity and the pattern of the workloads that a semiconductor storage device will undergo before throttling the performance of the semiconductor storage device. Only after the intensity and the pattern of workloads are obtained, the optimal performance of the semiconductor storage device can be drawn involving the ensured life and the endurance limit of the semiconductor storage device.

FIG. 1 is a schematic block diagram of a data storage system 1 according to some embodiments of the present inventive concept. The data storage system 1 includes a semiconductor storage device 10 and a host 20. The semiconductor storage device 10 includes a controller 100 and a non-volatile memory device 200, such as, for example, a flash memory device.

The host 20 may communicate with the semiconductor storage device 10 using an interface protocol such as Peripheral Component Interconnect Express (PCI-E), Advanced Technology Attachment (ATA), Serial ATA (SATA), Parallel ATA (PATA), or Serial Attached SCSI (SAS). However, the interface protocol between the host 20 and the semiconductor storage device 10 is not restricted to the above examples, and may be a universal serial bus (USB) protocol, a multi-media card (MMC) protocol, or an integrated drive electronics (IDE) protocol.

The semiconductor storage device 10 may be a solid state drive (SSD) or a secure digital (SD) card, but the present inventive concept is not restricted thereto. The non-volatile memory device 200 may be a flash memory device, but the present inventive concept is not restricted thereto. The non-volatile memory device 200 may be a phase-change random access memory (PRAM) device, a magnetic RAM (MRAM) device, a resistive RAM (ReRAM) device, or a ferroelectric RAM (FeRAM) device. When the non-volatile memory device 200 is a flash memory device, it may be a NAND flash memory device using a floating gate or charge trap flash (CTF). Memory cell transistors included in the non-volatile memory device 200 may be arranged in two dimensions or in three dimensions.

The controller 100 controls the overall operation of the semiconductor storage device 10 and controls all data exchange between the host 20 and the non-volatile memory device 200. For instance, the controller 100 controls the non-volatile memory device 200 to write or read data at the request of the host 20. Also, the controller 100 controls internal operations, such as performance throttling, merging, and wear-leveling, necessary for the characteristics or the efficient management of the non-volatile memory device 200.

The non-volatile memory device 200 is a storage device to store data in a non-volatile state. It may store an operating system (OS), various programs, and diverse data.

Figure 2:
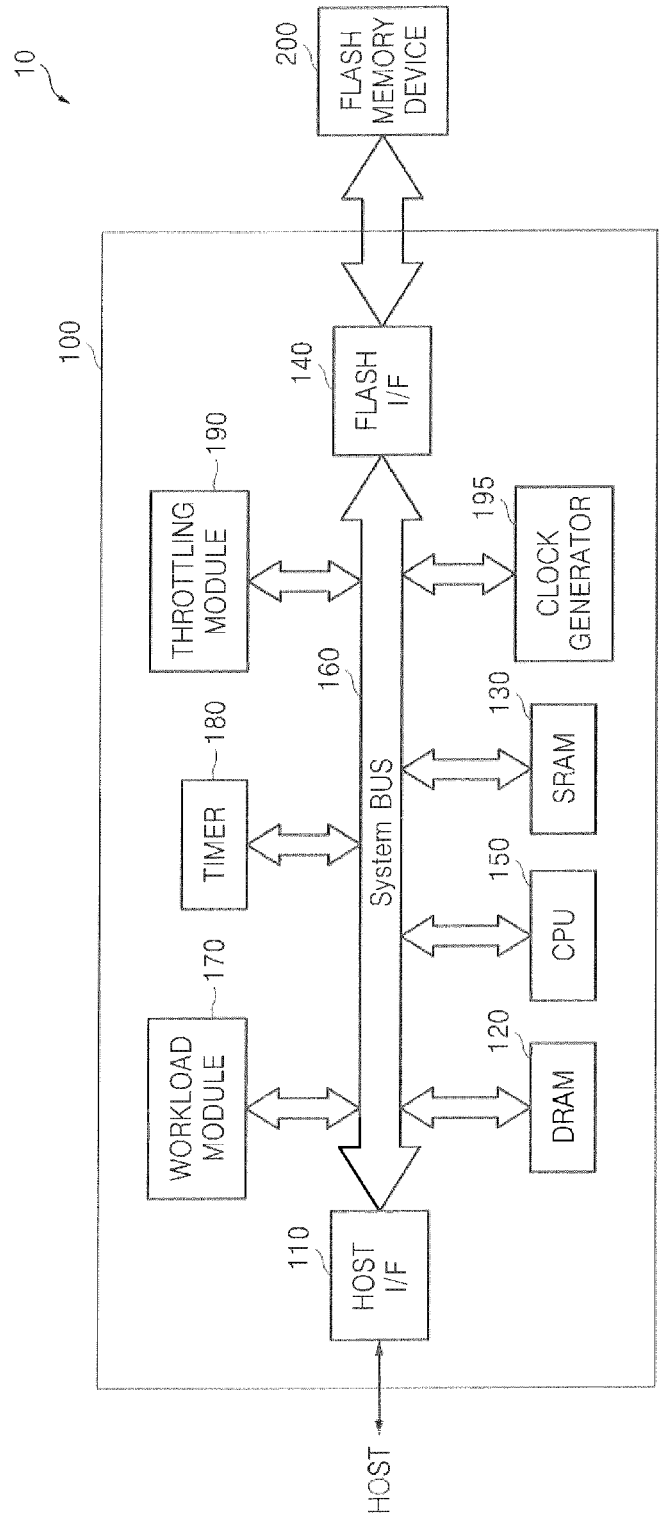
FIG. 2 is a schematic block diagram of a controller according to some embodiments of the present inventive concept.

FIG. 2 is a schematic block diagram of the controller 100 according to some embodiments of the present inventive concept. The controller 100 includes a host interface (I/F) 110, a dynamic RAM (DRAM) 120, a static RAM 130, a memory interface I/F 140, a central processing unit (CPU) 150, a bus 160, a workload module 170, a timer 180, a throttling module 190, and a clock generator 195.

The host interface I/F 110 is equipped with one of the interface protocols described above to communicate with the host 20. The DRAM 120 and the SRAM 130 store data and/or programs in a volatile state. The memory I/F 140 interfaces with the non-volatile memory device 200. The CPU 150 performs an overall control operation to write data to and/or read data from the non-volatile memory device 200. The workload module 170 gathers workload data related with a workload put on the semiconductor storage device 10 and estimates the workload based on the gathered workload data. The throttling module 190 determines a target performance level according to the workload estimated by the workload module 170 and throttles the performance of the semiconductor storage device 10 based on the determined performance level. The timer 180 provides time information to the CPU 150, the workload module 170, and the throttling module 190.

The workload module 170, the timer 180, and the throttling module 190 may be implemented in hardware, software, or combination thereof. When the workload module 170, the timer 180, and the throttling module 190 are implemented in software, a relevant program may be stored in the non-volatile memory device 200 and it may be loaded to the SRAM 130 and executed by the CPU 150 when the semiconductor storage device 10 is powered on.

The clock generator 195 generates a clock signal necessary for the operation of each of the CPU 150, the DRAM 120, and the non-volatile memory device 200, and provides it to each element. The clock signals respectively provided to the CPU 150, the DRAM 120, and the non-volatile memory device 200 may have different speeds. The clock generator 195 may control the speed of a clock signal applied to each of the CPU 150, the DRAM 120, and the non-volatile memory device 200 according to the performance level determined by the throttling module 190, so that the performance of the semiconductor storage device 10 can be throttled.

Although not shown, the semiconductor storage device 10 may also include other elements such as a read-only memory (ROM), which stores code data executed when the semiconductor storage device 10 is powered on, and an error correction code (ECC) engine, which encodes data to be stored in the non-volatile memory device 200 and decodes data read from the non-volatile memory device 200.

Figure 3:
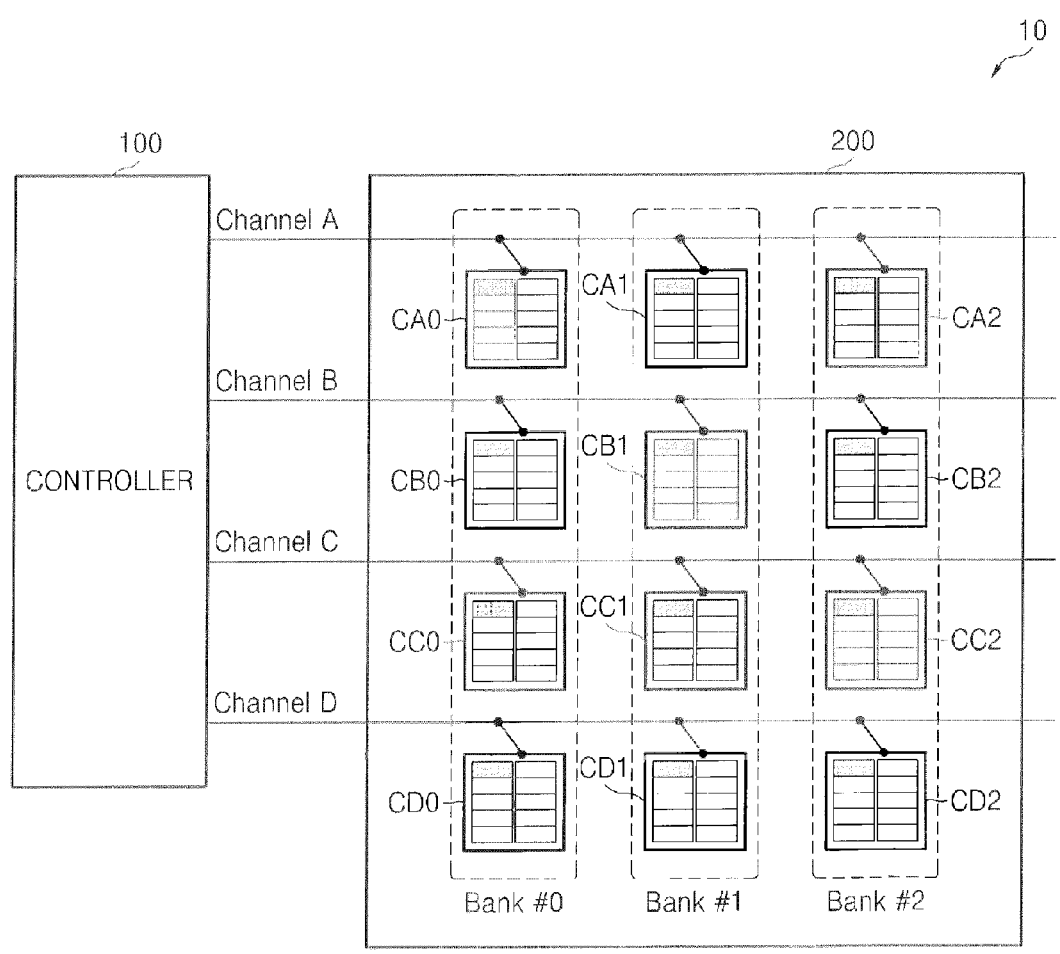
FIG. 3 is a diagram showing the schematic structure of a non-volatile memory device illustrated in FIG. 2.

FIG. 3 is a diagram showing the schematic structure of the non-volatile memory device 200 illustrated in FIG. 2. The non-volatile memory device 200 may include a plurality of memory elements. The non-volatile memory device 200 illustrated in FIG. 3 has the hardware structure of 4 channels and 3 banks, but the present inventive concept is not restricted thereto.

In the semiconductor storage device 10 illustrated in FIG. 3, the controller 100 is connected with the non-volatile memory device 200 through four channels A, B, C, and D each of which is connected to three flash memory elements CA0 through CA2, CB0 through CB2, CC0 through CC2, or CD0 through CD2, respectively. It is apparent that the numbers of channels and banks are not restricted to the current embodiments, but may be changed. In such a structure, the performance of the semiconductor storage device 10 may be throttled by the entire non-volatile memory device 200, by buses or channels shared by memory elements or chips, by banks, or by individual memory elements. Here, a bank is a group of memory elements positioned at the same offset on different channels.

Figure 4:
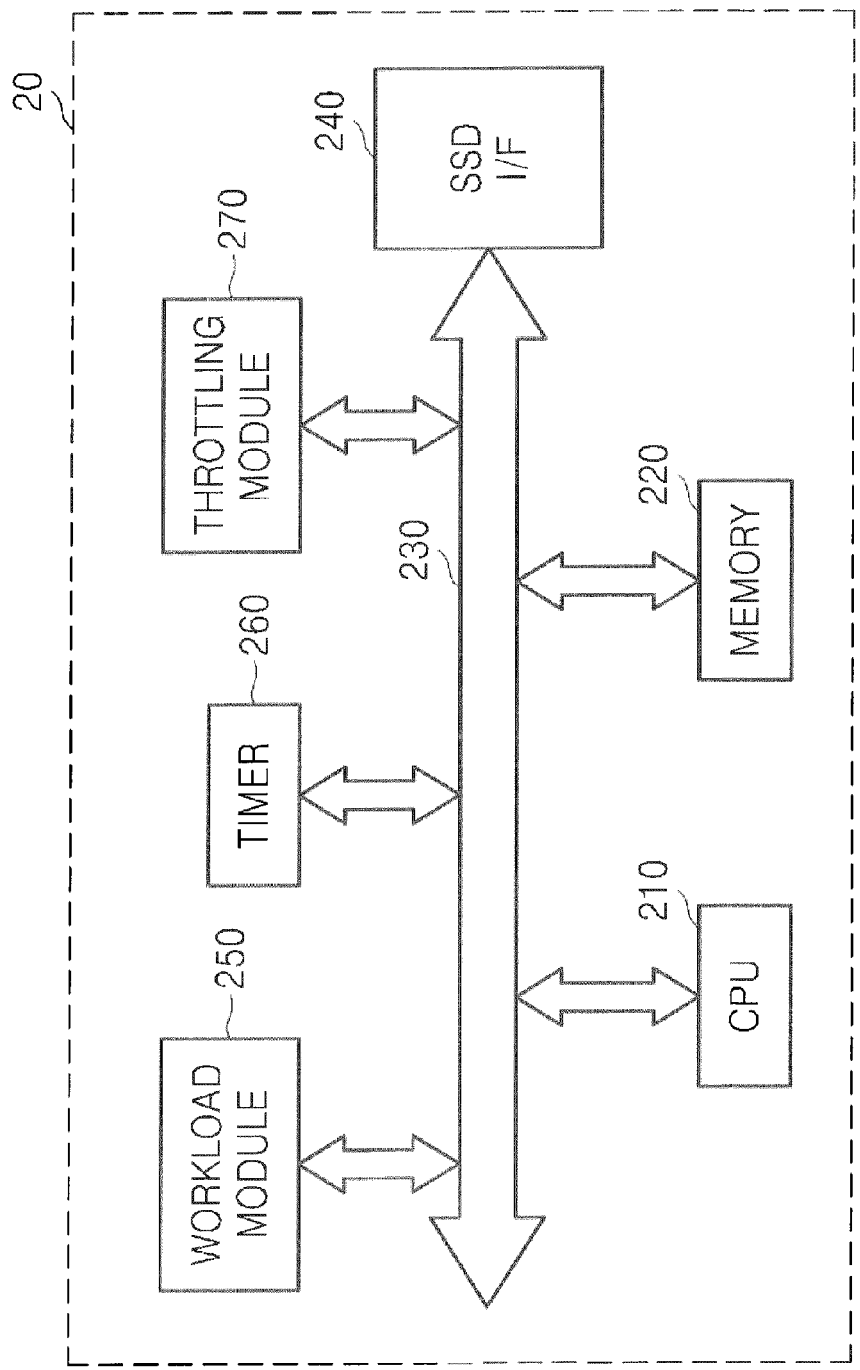
FIG. 4 is a schematic block diagram of a host according to some embodiments of the present inventive concept.

FIG. 4 is a schematic block diagram of the host 20 according to some embodiments of the present inventive concept. The host 20 includes a CPU 210, a memory 220, a bus 230, a storage device I/F 240, a workload module 250, a timer 260, and a throttling module 270.

The storage device interface I/F 240 is equipped with an interface protocol to communicate with the semiconductor storage device 10. The CPU 210 performs an overall control operation to write data to and/or read data from the semiconductor storage device 10. The workload module 250 gathers workload data related with a workload put on the semiconductor storage device 10 and estimates the workload based on the gathered workload data. The throttling module 270 determines a target performance level according to the workload estimated by the workload module 250 and throttles the performance of the semiconductor storage device 10 based on the determined performance level. The timer 260 provides time information to the CPU 210, the workload module 250, and the throttling module 270.

The workload module 250, the timer 260, and the throttling module 270 may be implemented in hardware, software, or combination thereof. The workload module 250 and the throttling module 270 are provided so that the host 20 can throttle or control the performance of the semiconductor storage device 10. When the semiconductor storage device 10 throttles the performance by itself without intervention of the host 20, the host 20 may not include the workload module 250 and the throttling module 270.

Figure 5:
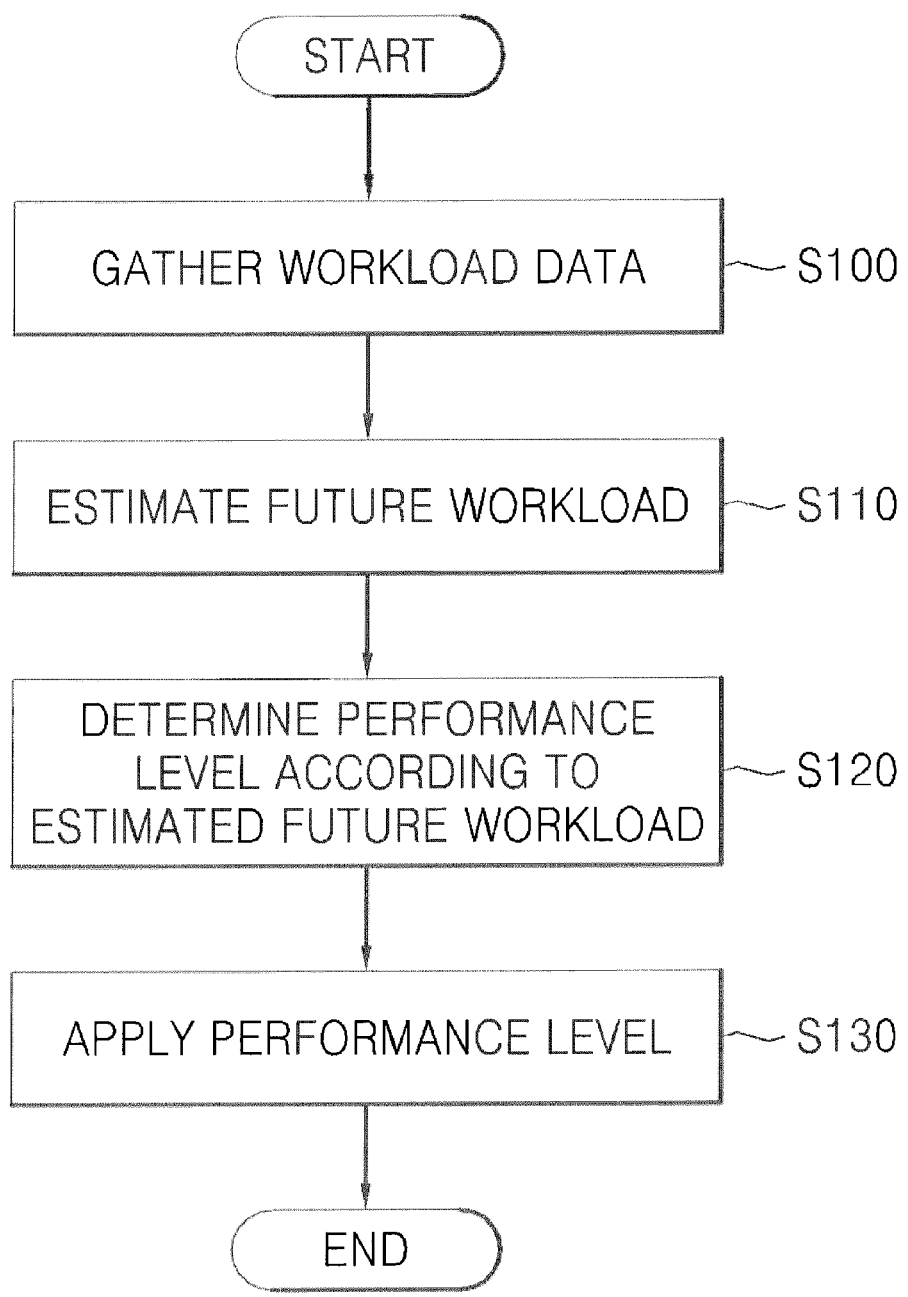
FIG. 5 is a flowchart of a method of operating a semiconductor storage device according to some embodiments of the present inventive concept.

FIG. 5 is a flowchart of a method of operating the semiconductor storage device 10 according to some embodiments of the present inventive concept. The method may be implemented in the semiconductor storage device 10 or the host 20 or distributedly implemented in both the semiconductor storage device 10 and the host 20. In the embodiments of the present inventive concept, the method is implemented in the semiconductor storage device 10, but the present inventive concept is not restricted to these embodiments.

Referring to FIG. 5, the controller 100 gathers workload data related to a workload put on the semiconductor storage device 10 in operation S100, and estimates a future workload of the semiconductor storage device 10 based on the workload data in operation S110. The controller 100 determines a target performance level according to the estimated future workload in operation S120 and applies the determined target performance level to the operations of the semiconductor storage device 10 in operation S130.

Figure 6:
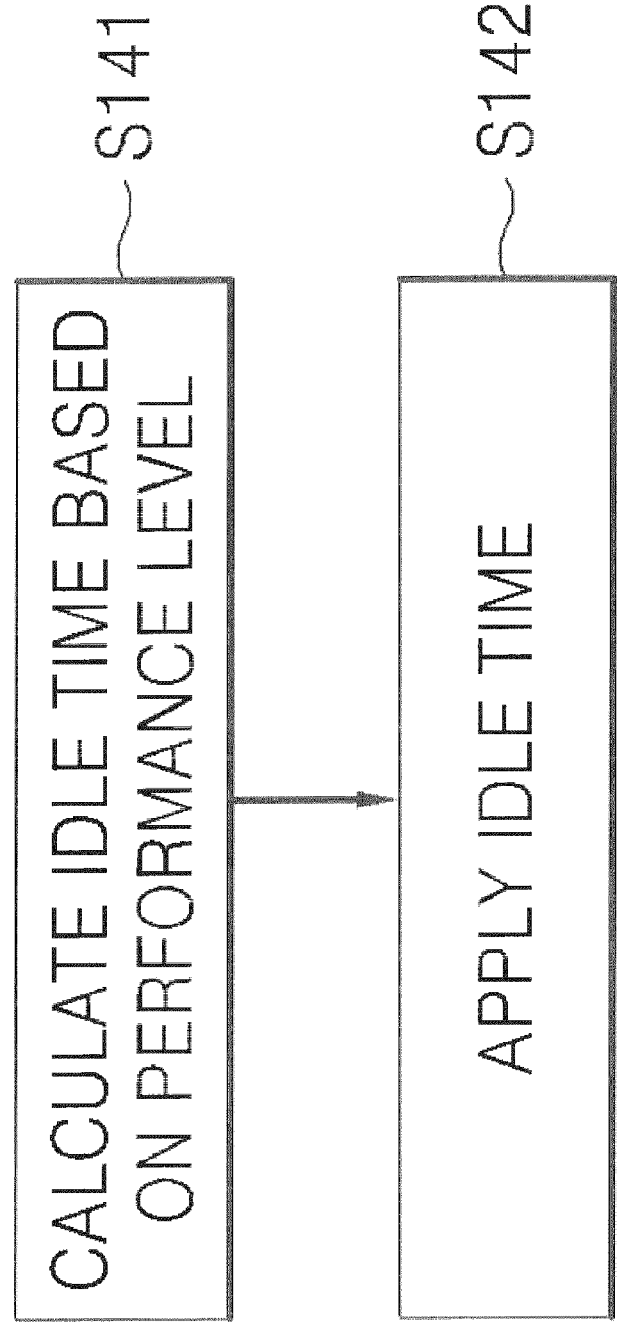
FIG. 6 is a flowchart of applying the performance level in operation S130 illustrated in FIG. 5 according to some embodiments of the present inventive concept.

FIG. 6 is a flowchart of applying the performance level in operation S130 illustrated in FIG. 5 according to some embodiments of the present inventive concept. Referring to FIG. 6, idle time(s) to be inserted between one or more operations of the semiconductor storage device 10 is calculated based on the performance level in operation S141. For example, the idle time calculated can be based on a delay in receiving data from the host 20. Alternatively, for example, the idle time to be inserted between one or more operations of the semiconductor storage device 10 can be determined based on an amount of workload. For example, if the workload of the SSD device is determined to be low at operation 100, then the idle time can be calculated to be lower in order to increase performance thereof. The idle time is applied in operation S142, as illustrated in FIG. 6.

As described above, the performance of the semiconductor storage device 10 may be throttled by inserting the idle time between one or more operations of the semiconductor storage device 10. The idle time may be inserted using the timer 180 or may be inserted by performing a meaningless operation (e.g., a NOP). The timer 180 may be implemented in hardware or software.

To effectively and decisively throttle the performance of the semiconductor storage device 10, the idle time may be designed to occur in addition to each unit operation of the semiconductor storage device 10. For instance, at each of a program operation to the non-volatile memory device 200, a read operation from the non-volatile memory device 200, a read/write operation from/to an internal buffer (e.g., a page buffer) of the non-volatile memory device 200, a read/write operation from/to a buffer (e.g., the DRAM 120 or the SRAM 130) of the controller 100, and a read/write operation from/to the host I/F 110, generation of a predetermined idle time or idle time proportional to the amount of data processed may be enabled.

Figure 7A:
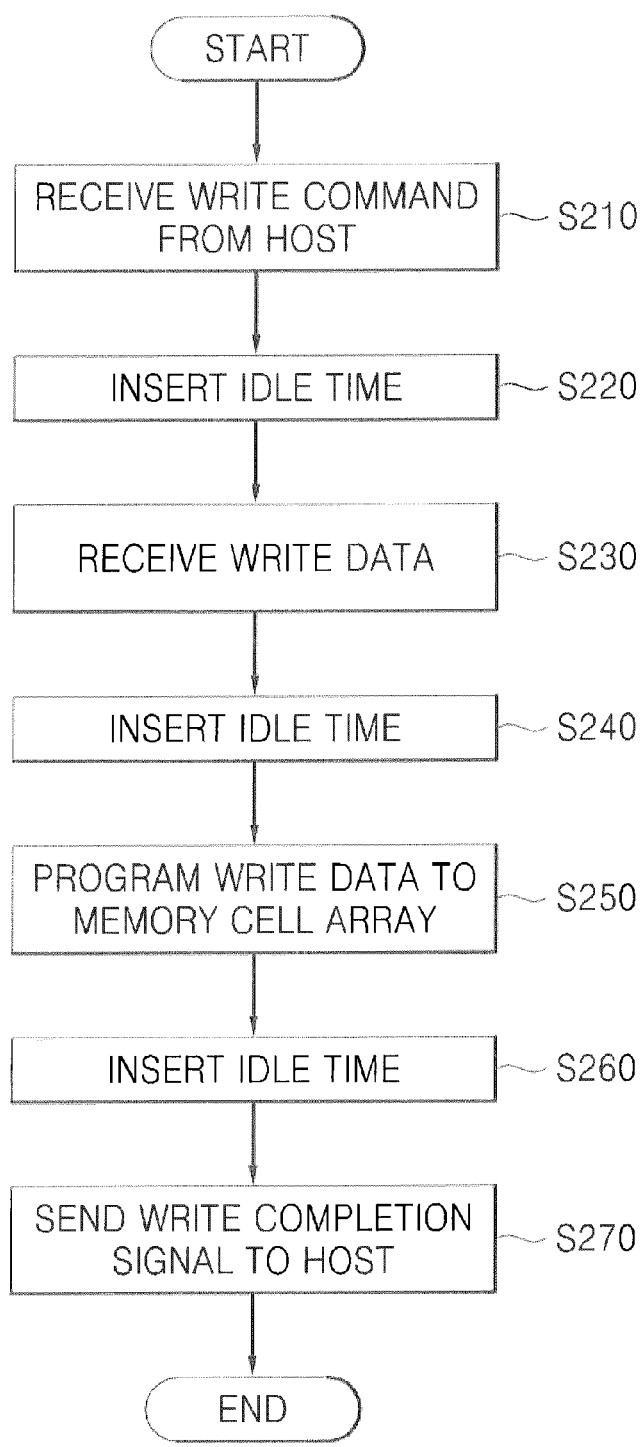
FIG. 7A is a flowchart of a method of throttling the writing performance of the semiconductor storage device 10 according to some embodiments of the present inventive concept.

FIG. 7A is a flowchart of a method of throttling the writing performance of the semiconductor storage device 10 according to some embodiments of the present inventive concept. When writing is performed by the semiconductor storage device 10, there may be at least two operations, i.e., operation S210 in which the controller 100 receives a write command from the host 20, operation S230 in which write data is received from the host 20, and operation S250 in which the write data is programmed to a memory cell array included in the non-volatile memory device 200. Alternatively, the host 20 can enable a cache buffer (not illustrated), at which time the operation of storing the write data in a memory cell array included in the non-volatile memory device 200 is optional. When the programming of the write data is completed, the semiconductor storage device 10 sends a write completion signal to the host 20 in operation S270. At this time, idle time may be inserted (operation S220, S240, or S260) after at least one of the operations S210, S230, and S250.

The idle time is calculated in operation S141 and may be a predetermined value or a value proportional to the amount of data processed. The idle time may be distributedly inserted after at least two operations, as shown in FIG. 7A, or may be inserted in a single block after a single operation. The idle time may be applied in units of the whole semiconductor storage device 10, in units of a bus or channel shared by individual elements of the semiconductor storage device 10, in units of a bank (or interleaving units), or in units of an individual element of the semiconductor storage device 10. Furthermore, the idle time can change or be the same at each write command, depending on an estimation of the workload data.

Figure 7B:
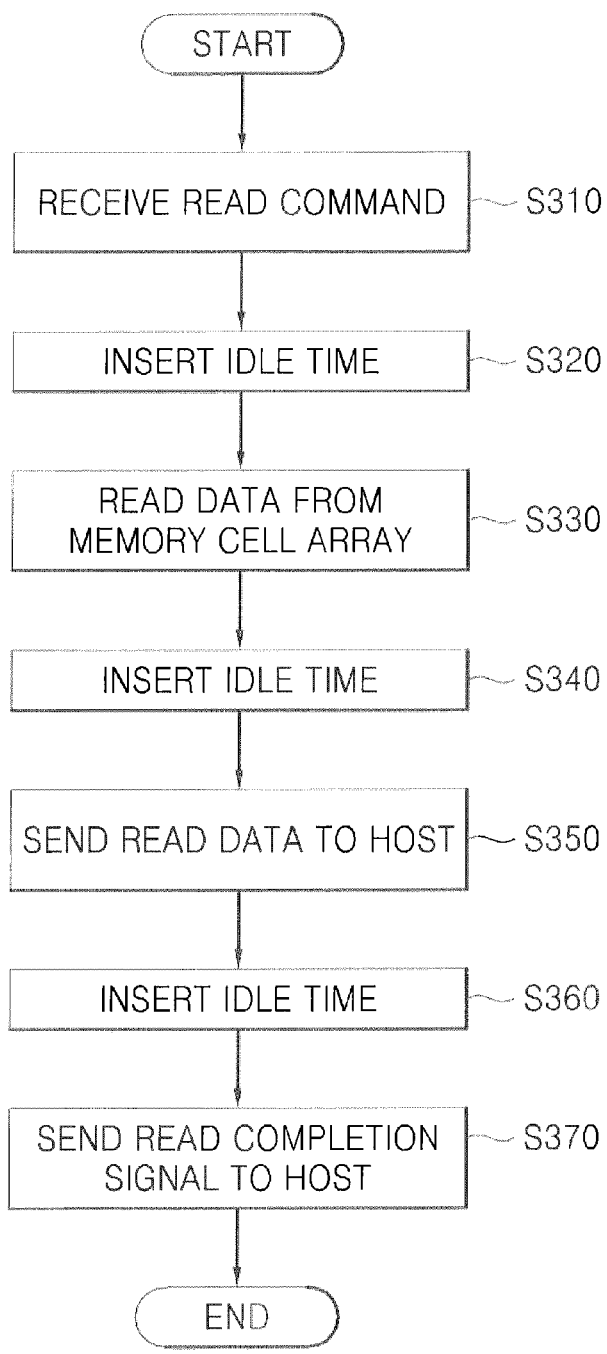
FIG. 7B is a flowchart of a method of throttling the reading performance of the semiconductor storage device 10 according to some embodiments of the present inventive concept.

FIG. 7B is a flowchart of a method of throttling the reading performance of the semiconductor storage device 10 according to some embodiments of the present inventive concept. When reading is performed by the semiconductor storage device 10, there may be at least two operations, i.e., operation S310 in which the controller 100 receives a read command from the host 20, operation S330 in which read data is read from a memory cell array included in the non-volatile memory device 200, and operation S350 in which the read data is sent to the host 20. After sending the read data to the host 20, the semiconductor storage device 10 sends a read completion signal to the host 20 in operation S370. At this time, idle time may be inserted (operations S320, S340, or S360) after at least one of the operations S310, S330, and S350.

The reading the read data from the memory cell array (operation S330) and the sending the read data to the host 20 (operation S350) may include the operations of issuing the read command to the non-volatile memory device 200 using the controller 100, reading the read data from the memory cell array of the non-volatile memory device 200 and storing it in an internal buffer (e.g., a page buffer) of the non-volatile memory device 200, storing the read data stored in the internal buffer of the non-volatile memory device 200 in a buffer of the controller 100, and transmitting the read data stored in the controller 100 to the host 20. The idle time may be inserted after at least one of those operations.

The idle time is calculated in operation S141 and may be a predetermined value or a value proportional to the amount of data processed in a given time period. The idle time may be distributedly inserted after at least two operations, as shown in FIG. 7B, or may be inserted in a single block after a single operation. The idle time may be applied in units of the whole semiconductor storage device 10, in units of a bus or channel shared by individual elements of the semiconductor storage device 10, in units of a bank (or interleaving units), or in units of an individual element of the semiconductor storage device 10.

Figure 8:
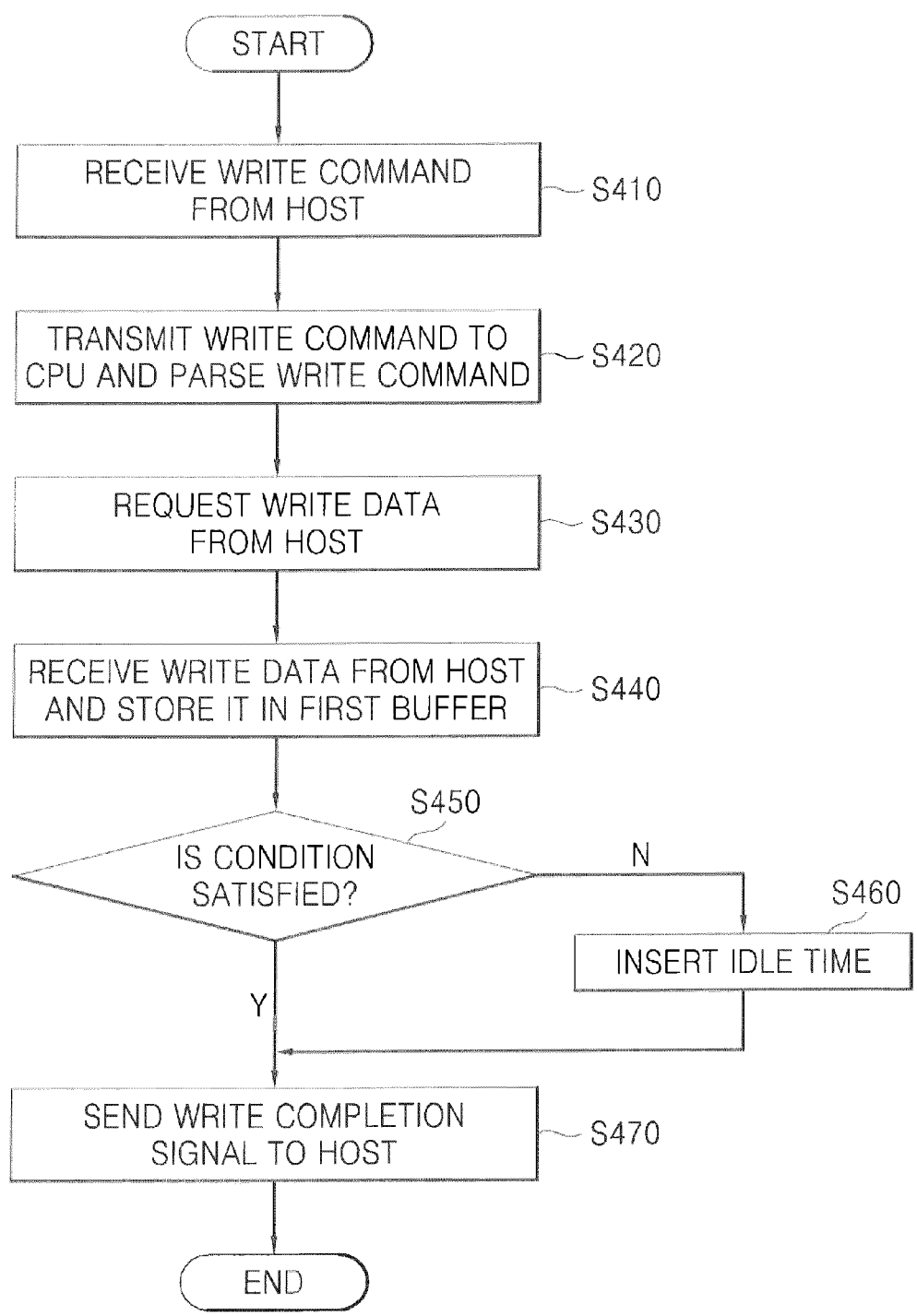
FIG. 8 is a detailed flowchart of the method of throttling the writing performance of the semiconductor storage device 10 according to some embodiments of the present inventive concept.
Figure 9:
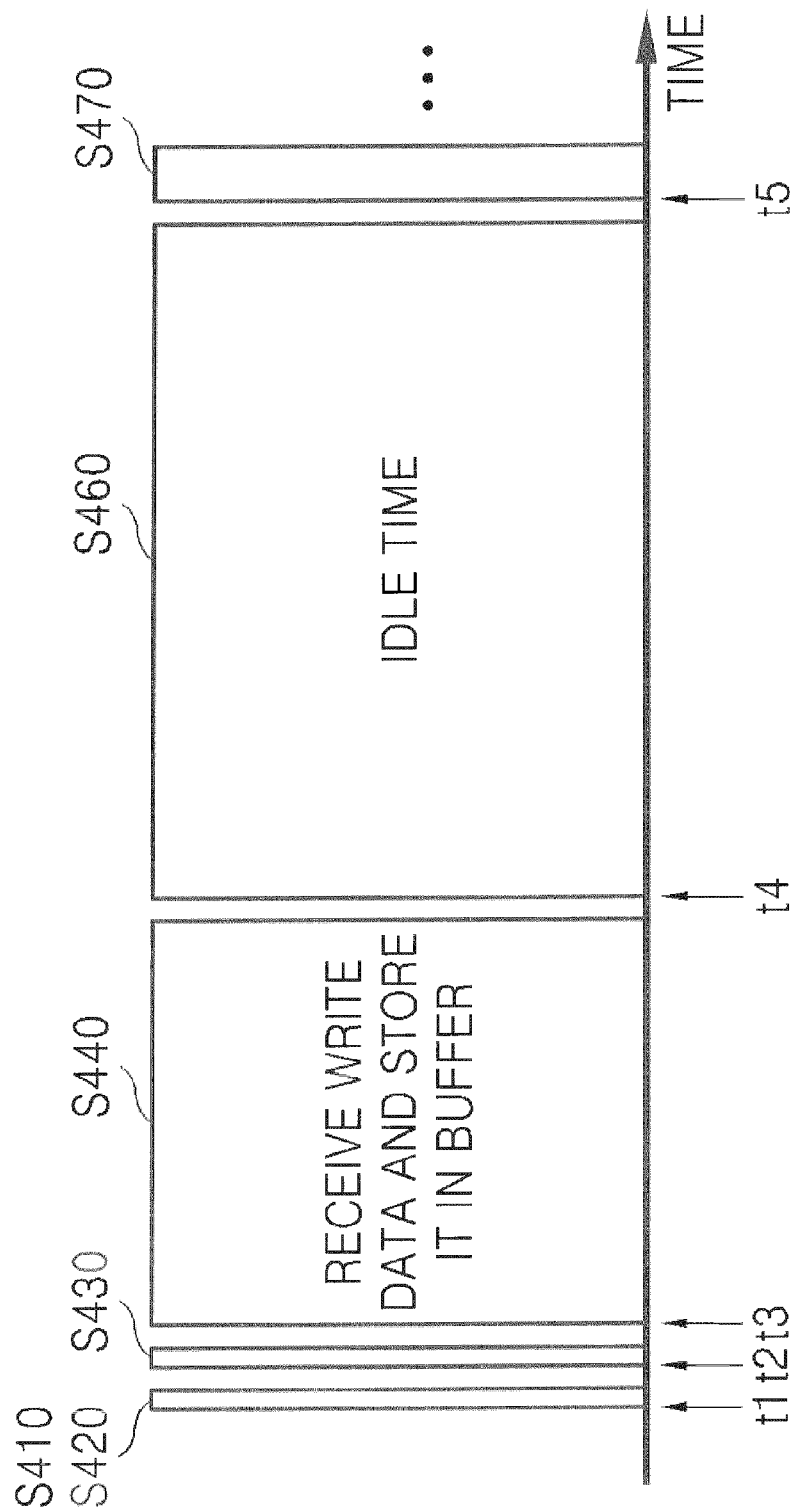
FIG. 9 is a schematic timing chart explaining the method illustrated in FIG. 8.

FIG. 8 is a detailed flowchart of the method of throttling the writing performance of the semiconductor storage device 10 according to some embodiments of the present inventive concept. FIG. 9 is a schematic timing chart explaining the method illustrated in FIG. 8. The host 20 sends a write command to the semiconductor storage device 10, that is, the semiconductor storage device 10 receives the write command from the host 20 at a time point "t1" in operation S410. The host I/F 110 of the controller 100 included in the semiconductor storage device 10 transmits the write command to the CPU 150 and the CPU 150 parses the write command to identify it in operation S420. The CPU 150 requests the host 20 to send write data at a time point "t2" through the host I/F 110 in operation S430. When the host 20 sends the write data at a time point "t3", the controller 100 receives the write data and temporarily stores it in a first buffer (e.g., the DRAM 120) therewithin, in operation S440. After completing storing the write data in the DRAM 120, the controller 100 checks whether a predetermined condition is satisfied, in operation S450. When the predetermined condition is satisfied, the controller 100 sends a write completion signal to the host 20 in operation S470. When the predetermined condition is not satisfied, idle time is inserted, in operation S460, before the write completion signal is sent to the host 20 in operation S470.

The predetermined condition may be a predetermined time point, e.g., "t5", when the write completion signal is sent. At this time, the controller 100 may check whether the time point "t5" has been reached in operation S450 after storing the write data in the DRAM 120 and may insert the idle time in operation S460 when the time point "t5" is not reached, so that the write completion signal is sent only at the time point "t5" in operation S470.

To check whether a predetermined time point is reached and/or whether the determined idle time elapses, the controller 100 may use the timer 180. For instance, the controller 100 checks a completion time point (around a time point "t4") at which storing the write data in the DRAM 120 is completed using the timer 180 and also checks whether the idle time elapses since the completion time point (around the time point "t4") using the time 180. The controller 100 does not send the write completion signal to the host 20 until the idle time elapses.

Figure 10:
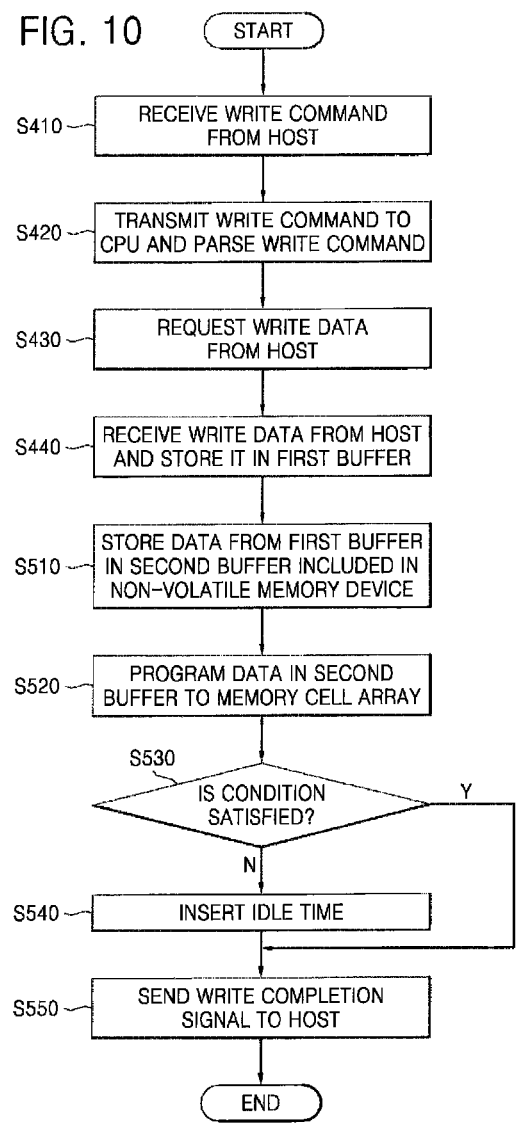
FIG. 10 is a detailed flowchart of the method of throttling the writing performance of the semiconductor storage device 10 according to other embodiments of the present inventive concept.
Figure 11:
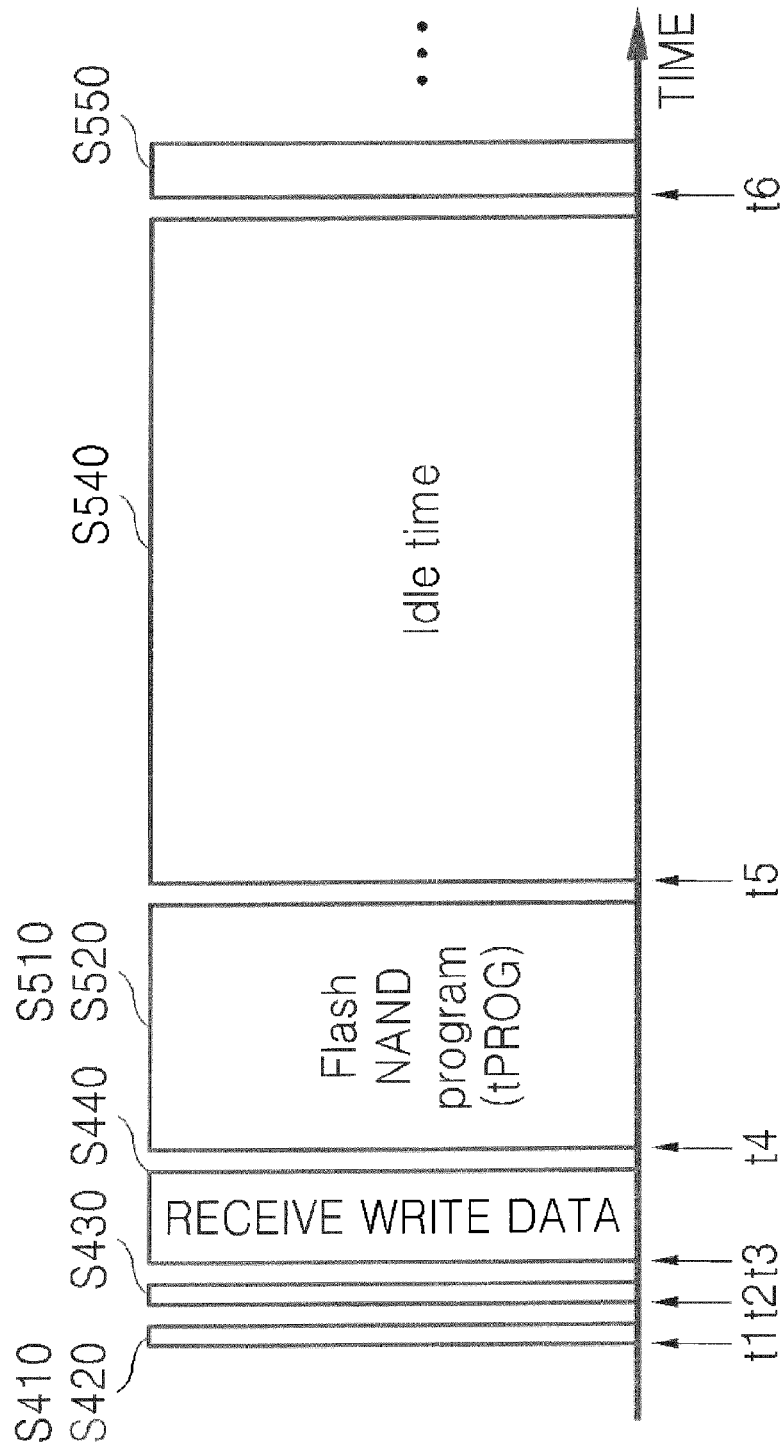
FIG. 11 is a schematic timing chart explaining the method illustrated in FIG. 10.

FIG. 10 is a detailed flowchart of the method of throttling the writing performance of the semiconductor storage device 10 according to other embodiments of the present inventive concept. FIG. 11 is a schematic timing chart explaining the method illustrated in FIG. 10. Referring to FIGS. 10 and 11, similar to the method illustrated in FIG. 8, the method illustrated in FIG. 10 may include receiving a write command from the host 20 in operation S410, requesting (from the controller 100) to the host 20 to send write data in operation S430 corresponding to the write command, and receiving the write data from the host 20 and temporarily storing it in the first buffer (e.g., the DRAM 120) of the controller 100 in operation S440.

Thereafter, the controller 100 stores the write data from the first buffer (e.g., the DRAM 120) in an internal buffer (referred to a second buffer (not shown)) of the non-volatile memory device 200 in operation S510 and programs the write data from the second buffer (e.g., a page buffer) to the memory cell array of the non-volatile memory device 200 in operation S520. After completing programming the write data to the memory cell array, the controller 100 checks whether a predetermined condition is satisfied, in operation S530. When the predetermined condition is satisfied, a write completion signal is sent to the host 20, in operation S550. When the predetermined condition is not satisfied, an idle time is inserted, in operation S540, before the write completion signal is sent to the host 20, in operation S550.

The predetermined condition may be a predetermined time point, e.g., "t6", when the write completion signal is sent. At this time, the controller 100 may check whether the time point "t6" has been reached, in operation S530, after programming the write data to the memory cell array and may insert the idle time in operation S540 when the time point "t6" has not been reached, so that the write completion signal is sent only at the time point "t6" in operation S550. For these operations, the controller 100 may use the timer 180 to check a time point when a program command is enabled to the non-volatile memory device 200 and check whether a predetermined time (i.e., the idle time) elapses since the program command has been enabled. The controller 100 does not send the write completion signal to the host 20 until the predetermined time, i.e., the idle time elapses. In other words, only after the predetermined time, i.e., the idle time elapses, the controller 100 sends the write completion signal to the host 20, in operation S550. In addition, the controller 100 does not enable another program command to the non-volatile memory device 200 until the idle time elapses.

To check the state of the non-volatile memory device 200, the controller 100 may include a status register (not shown). For instance, the status register may be set to "1" while the non-volatile memory device 200 is busy and may be set to "0" when the non-volatile memory device 200 is not busy. Accordingly, the status register may have a value of "1" from the time when the program command is enabled to the non-volatile memory device 200 until the time when the programming is completed, and then may have a value of "0" since the programming is completed. The controller 100 may detect whether the programming is completed by periodically checking the status register or based on an interrupt generated when the value of the status register changes.

In the same manner as the timer 180 is used to check whether the predetermined time point is reached and/or whether the idle time elapses in the method of throttling the writing performance of the semiconductor storage device 10, the timer 180 may also be used to check whether the predetermined time point is reached and/or whether the idle time elapses in the method of throttling the reading performance of the semiconductor storage device 10. In the above embodiments of the present inventive concept, the buffer (e.g., the DRAM 120) of the controller 100 and the internal buffer (e.g., a page buffer) of the non-volatile memory device 200 are both used, but the present inventive concept is not restricted to those embodiments. Alternatively, for example, only one buffer may be used.

Table 1 shows idle time durations for target performance when idle time is generated in units of an individual element of the semiconductor storage device 10 during a page program operation. At this time, the non-volatile memory device 200 has an architecture of eight channels and eight banks and uses NAND flash memory which is an MLC NAND flash type with a design rule of 32 nm.

TABLE 1

| Target performance (sequential write, MB/s) | Idle time durations (us) |
|---|---|
| 50 | 8900~9000 |
| 75 | 5400~5500 |
| 100 | 3700~3800 |
| 125 | 2600~2700 |
| 150 | 1900~2000 |
| 175 | 1400~1500 |
| 200 | 1000~1100 |
| 225 | 800~900 |
| 250 | 500~600 |
| MAX | 0 |

Table 2 shows idle time durations according to target performance when the target performance is represented with a percentage to the maximum performance (100%).

TABLE 2

| Target performance (sequential write, percentage (%) to maximum performance) | Idle time durations (us) |
|---|---|
| 55 | 8900~9000 |
| 60 | 5400~5500 |
| 65 | 3700~3800 |
| 70 | 2600~2700 |
| 75 | 1900~2000 |
| 80 | 1400~1500 |
| 85 | 1000~1100 |
| 90 | 800~900 |
| 95 | 500~600 |
| 100 | 0 |

Referring to Tables 1 and 2, the idle time is not inserted when the target performance is maximum (i.e., MAX or 100), and the idle time does get inserted and also increases when the target performance decreases.

As illustrated in Tables 1 and 2, a look-up table including idle time durations according to target performance may be embodied and stored in a memory of the controller 100 and/or the non-volatile memory device 200. Similarly, a look-up table including target performance levels according to the estimated workload may be embodied and stored in a memory of the controller 100 and/or the non-volatile memory device 200. Furthermore, a look-up table including idle time durations according to the estimated workload may be embodied and stored in a memory of the controller 100 and/or the non-volatile memory device 200.

An exemplary embodiment of the present inventive concept may be implemented in hardware, software, or combination thereof. In case that an exemplary embodiment of the present inventive concept is implemented in software, a performance throttling program including a plurality of subroutine codes for executing the method of throttling performance of a semiconductor storage device may be stored in the non-volatile memory device 200. The controller 100 may execute the method of throttling performance of a semiconductor storage device by executing the plurality of subroutine codes stored in the non-volatile memory device.

The performance throttling program may include a first subroutine code that allows the controller to receive the write command from the host; a second subroutine code that allows the controller to receive the write data from the host; a third subroutine code that allows the controller to program the write data to the non-volatile memory device in response to the write command; a fourth subroutine code that allows the controller to send a write completion signal to the host; and a fifth subroutine code that allows the controller to insert the idle time before sending the write completion signal to the host after programming the write data to the non-volatile memory device.

The performance throttling program may include a first subroutine code that allows the controller to receive the read command from the host; a second subroutine code that allows the controller to read the read data from the non-volatile memory device in response to the read command; a third subroutine code that allows the controller to send the read data to the host; a fourth subroutine code that allows the controller to send a read completion signal to the host; and fifth subroutine code that allows the controller to insert the idle time before reading the read data from the non-volatile memory device after receiving the read command from host.

The semiconductor storage device 10 according to an exemplary embodiment of the present inventive concept may be embedded in the electronic system such as mobile devices, laptop computers, or desktop computers. Some examples of the electronic system are illustrated in FIGS. 12 through 14.

Figure 12:
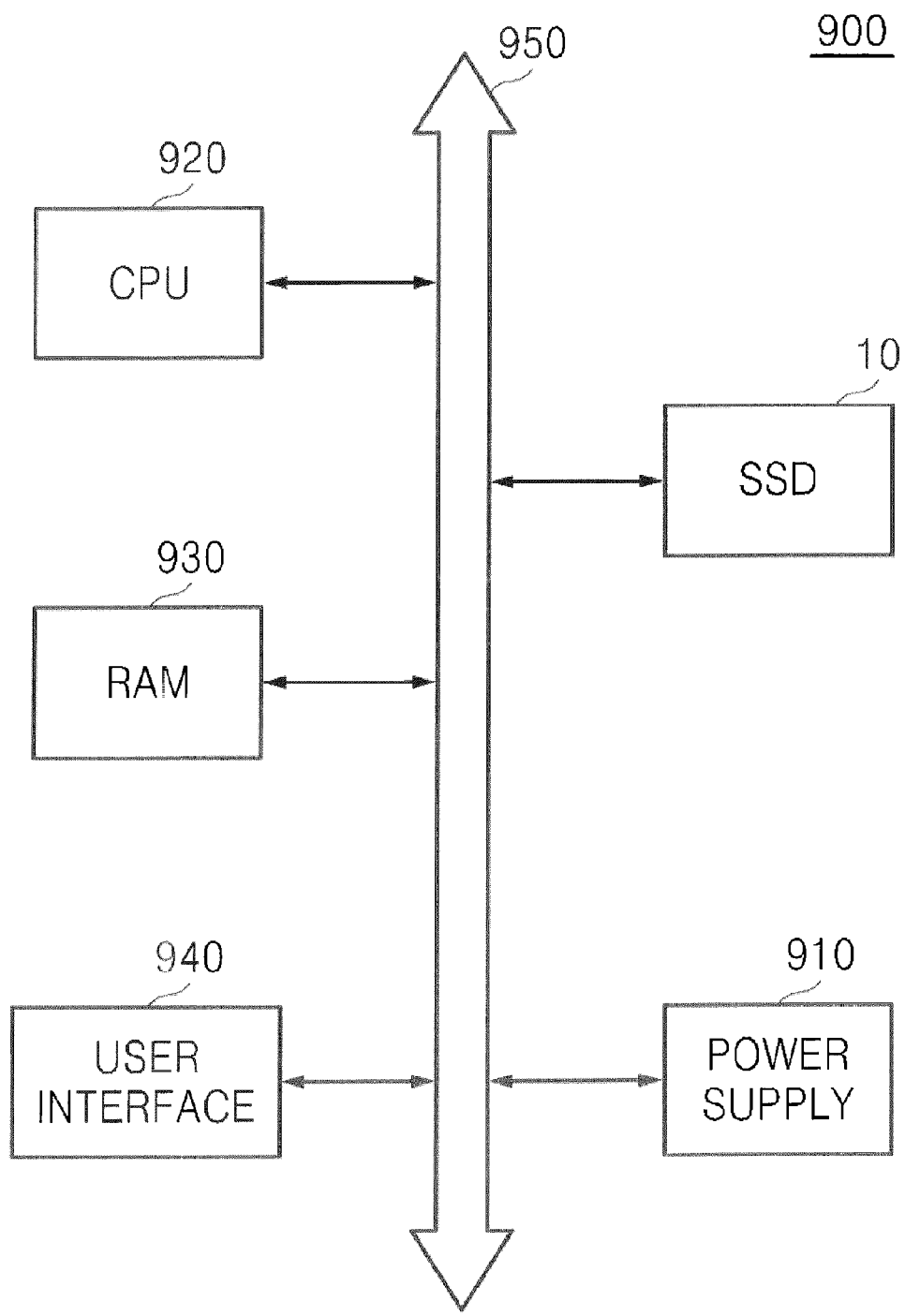
FIG. 12 is a block diagram of an electronic system according to some embodiments of the present inventive concept.

FIG. 12 is a block diagram of an electronic system according to some embodiments of the present inventive concept.

Referring to FIG. 12, the electronic system 900 according to the present exemplary embodiment may include a semiconductor storage device 10, a power supply 910, a central processing unit (CPU) 920, a RAM 930, a user interface 940, and a system bus 950 electrically connecting these elements.

The CPU 920 controls the overall operation of the electronic system 900. The RAM 930 stores information needed for the operation of the electronic system 900. The user interface 940 provides an interface between the electronic system 900 and a user. The power supply 910 supplies electric power to the internal constituent elements such as the CPU 920, the RAM 930, the user interface 940, and the semiconductor storage device 10.

The CPU 920 may correspond to the host, and the semiconductor storage device 10 may store or read data in response to a command from the host. The semiconductor storage device 10 according to an exemplary embodiment of the present inventive concept is as described above. A detailed description thereof will be thus omitted.

Figure 13A:
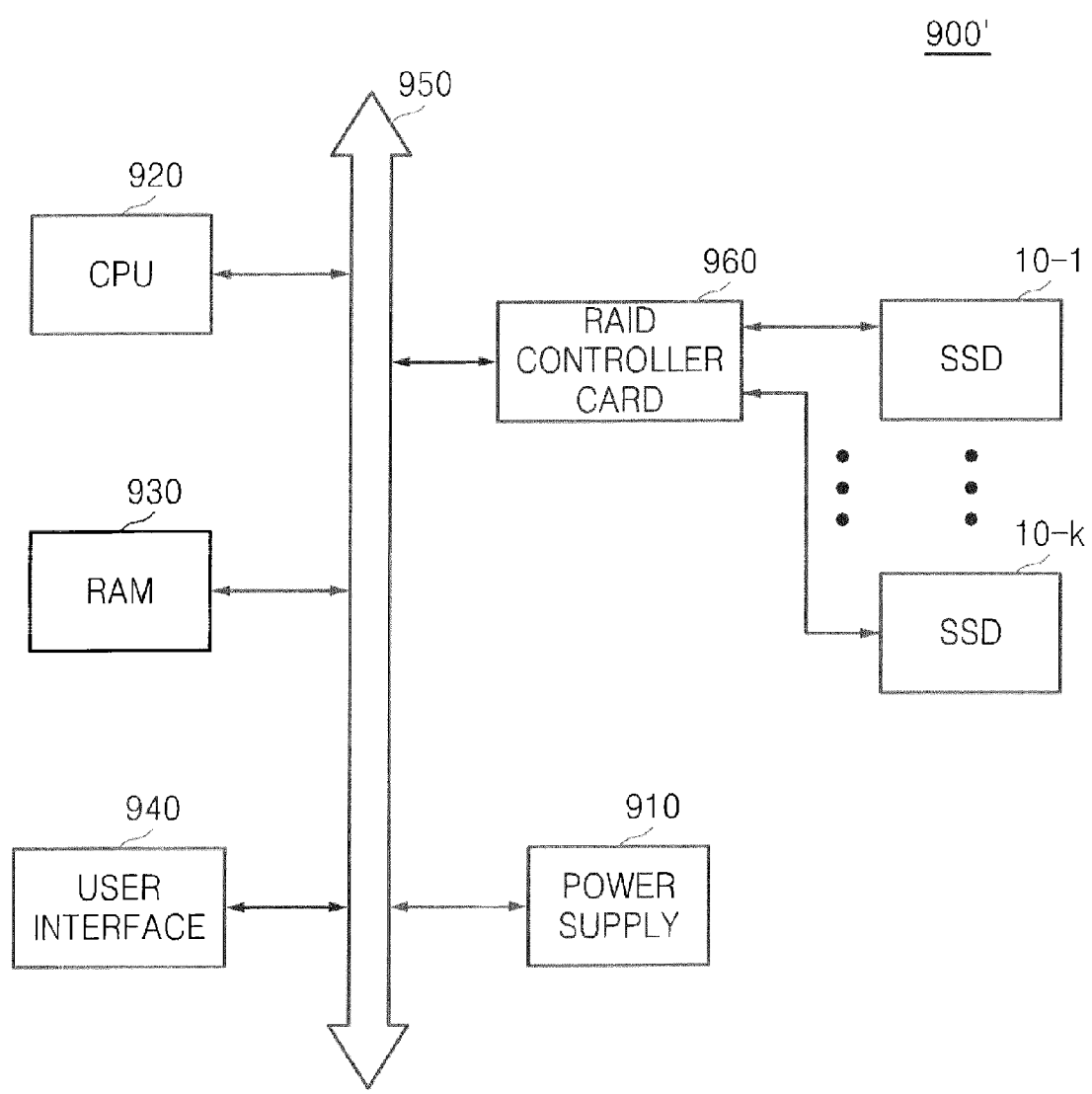
FIGS. 13A and 13B are a block diagram of an electronic system according to some embodiments of the present inventive concept, respectively.
Figure 13B:
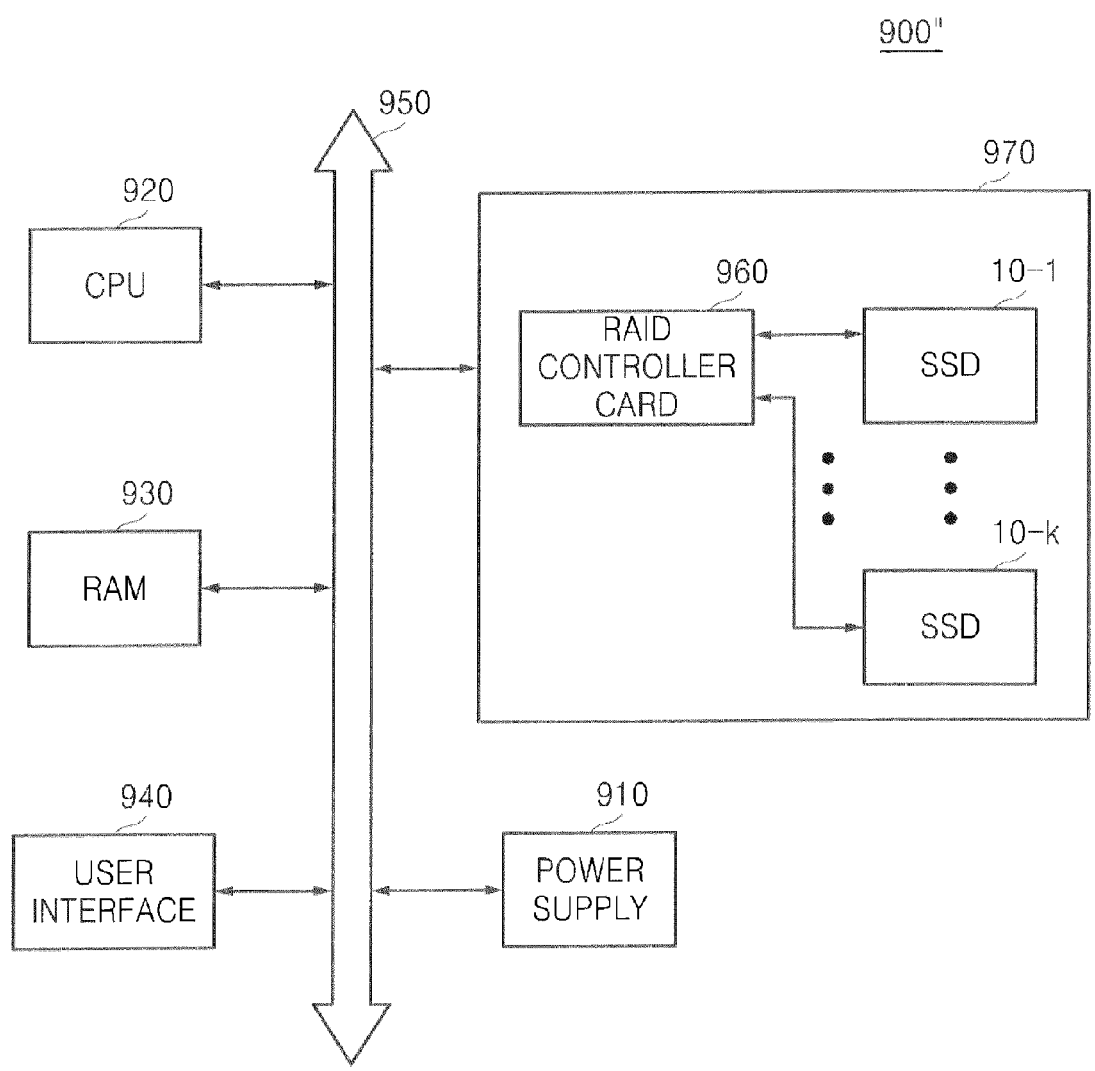

FIGS. 13A and 13B are block diagrams of an electronic system according to other exemplary embodiments of the present inventive concept, respectively.

The electronic system as illustrated in FIG. 13A has a similar configuration to the electronic system as illustrated in FIG. 12, and therefore only differences there-between will be described to avoid a repeated description.

The electronic system as illustrated in FIG. 13A further include a RAID controller card 960 as compared with the electronic system as illustrated in FIG. 12. The RAID controller card 960 is connected between the host and the semiconductor storage device 10 to control the semiconductor storage device in compliance with the host. That is, the semiconductor storage device 10 is installed into the RAID controller card 960 and communicates with the host via the RAID controller card 960. In this case, a plurality of semiconductor storage devices 10-1 through 10-k may be installed into the RAID controller card 960.

The RAID controller card 960 illustrated in FIG. 13A is implemented as a separate product external of the plurality of semiconductor storage devices 10-1 through 10-k.

The electronic system as illustrated in FIG. 13B has a similar configuration to the electronic system as illustrated in FIG. 13A, and only differences there-between will be described so as to avoid a repeated description. The RAID controller card 960 illustrated in FIG. 13B is implemented as a single product 970 with the plurality of semiconductor storage devices 10-1 through 10-k.

FIG. 14 shows a block diagram of a computer system 1000 having a solid state drive (SSD) implemented as the semiconductor storage device 10 of FIG. 1. The computer system 1000 includes a computer CPU (central processing unit) 1110, and includes an AGP (accelerated graphics port) device 1120 and a main memory 1130 coupled to the computer CPU 1110 via a north bridge 1140. The computer system 200 further includes a keyboard controller 1160, a printer controller 1170, and the SSD 10 coupled to the computer CPU 1110 via a south bridge 1180 and the north bridge 1140. The components 1110, 1120, 1130, 1140, 1160, 1170, and 1180 of the PC system 1000 are generally and individually known to one of ordinary skill in the art. The computer system maybe a PC (personal computer) system a notebook computer in which the SSD is used as a main storage device instead of hard disk drive. However, the present inventive concept is not restricted thereto.

As described above, according to embodiments of the present inventive concept, the performance of the semiconductor storage device can be effectively throttled by inserting idle time after at least one of operations of the semiconductor storage device according to an estimated workload.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. A method of ensuring the expected life of a semiconductor storage device (SSD) including a non-volatile memory device and a controller to control the non-volatile memory device, the method comprising:
monitoring write workload of the SSD based on write commands received from a host device;
receiving a first write command from the host device;
sending an acknowledgement signal of the first write command to the host device; and
determining an idle time for the SSD based on the write workload; and
intentionally idling the SSD for the idle time between the receiving and the sending.

2. The method of claim 1, wherein the determining increases the idle time as the write workload increases.

3. The method of claim 1, wherein the intentionally idling uses a timer.

4. The method of claim 3, wherein the intentionally idling comprises:
checking a time point when the first write command is enabled to the SSD and checking whether the idle time elapses since the first write command has been enabled, using the timer.

5. The method of claim 1, wherein the intentionally idling inserts a meaningless time consuming operation.

6. The method of claim 1, wherein the determining determines the idle time based on counting one of a number of the write commands, an amount of data received from the host device in response to the write commands, and a number of program operations performed in the SSD.

7. The method of claim 1, wherein the method is applied to a unit of the SSD, the unit being one of the SSD, a bus or channel shared by individual elements of the SSD, a bank of the SSD, and an individual element of the SSD.

8. The method of claim 1, further comprising:
receiving write data from the host device;
storing the write data in a DRAM; and
sending a write completion signal of the first write command to the host device.

9. A method of ensuring the expected life of a semiconductor storage device (SSD) including a non-volatile memory device and a controller to control the non-volatile memory device, the method comprising:
monitoring write workload of the SSD based on write commands received from a host device;
receiving a first write command from the host device;
sending an acknowledgement signal of the first write command to the host device;
receiving write data from the host device;
storing the write data in a DRAM;
determining an idle time for the SSD based on the write workload;
intentionally idling the SSD for the idle time; and
sending a write completion signal of the first write command to the host device after the idling.

10. The method of claim 9, wherein the determining increases the idle time as the write workload increases.

11. The method of claim 9, wherein the intentionally idling uses a timer.

12. The method of claim 11, wherein the intentionally idling comprises:
checking a time point when the first write command is enabled to the SSD and checking whether the idle time elapses since the first write command has been enabled, using the timer.

13. The method of claim 9, wherein the intentionally idling inserts a meaningless time consuming operation.

14. The method of claim 9, wherein the determining determines the idle time based on counting one of a number of the write commands, an amount of data received from the host device in response to the write commands, and a number of program operations performed in the SSD.

15. The method of claim 9, wherein the method is applied to a unit of the SSD, the unit being one of the SSD, bus or channel shared by individual elements of the SSD, a bank of the SSD, and an individual element of the SSD.

16. A method of ensuring the expected life of a semiconductor storage device (SSD) including a non-volatile memory device and a controller to control the non-volatile memory device, the method comprising:
monitoring write workload of the SSD based on write commands received from a host device; receiving a first write command from the host device;
sending an acknowledgement signal of the first write command to the host device;
receiving write data from the host device;
storing the write data in a DRAM;
storing the write data in a page buffer of the non-volatile memory device from the DRAM;
programming the write data from the page buffer to the memory cell array of the non-volatile memory device;
determining an idle time for the SSD based on the write workload;
intentionally idling the SSD for the idle time; and
sending a write completion signal of the first write command to the host device after the idling.

17. The method of claim 16, wherein the determining increases the idle time as the write workload increases.

18. The method of claim 16, wherein the intentionally idling uses a timer.

19. The method of claim 18, wherein the intentionally idling comprises:
checking a time point when the first write command is enabled to the SSD and checking whether the idle time elapses since the first write command has been enabled, using the timer.

20. The method of claim 16, wherein the intentionally idling inserts a meaningless time consuming operation.

21. The method of claim 16, wherein the determining determines the idle time based on counting one of a number of the write commands, an amount of data received from the host device in response to the write commands, and a number of program operations performed in the SSD.

22. The method of claim 16, wherein the method is applied to a unit of the SSD, the unit being one of the SSD, a bus or channel shared by individual elements of the SSD, a bank of the SSD, and of an individual element of the SSD.

23. A method of ensuring the expected life of a semiconductor storage device (SSD) including a non-volatile memory device and a controller to control the non-volatile memory device, the method comprising:
monitoring write workload of the SSD based on write commands received from a host device;
receiving a write request including,
receiving a first write command from a host, and
receiving write data from the host;
programming the write data to the non-volatile memory device in response to the write command;
determining an idle time for the SSD based on the write workload; and
intentionally idling the SSD for the idle time after one of receiving the first write command, after receiving the write data, and after the programming.

24. The method of claim 23, wherein the determining increases the idle time as the write workload increases.

25. The method of claim 23, wherein the intentionally idling uses timer.

26. The method of claim 25, wherein the intentionally idling comprises:
checking a time point when the first write command is enabled to the SSD and checking whether the idle time elapses since the first write command has been enabled, using the timer.

27. The method of claim 23, wherein the intentionally idling inserts a meaningless time consuming operation.

28. The method of claim 23, wherein the determining determines the idle time based on counting one of a number of the write commands, an amount of data received from the host in response to the write commands, and a number of program operations performed in the SSD.

29. The method of claim 23, wherein the method is applied to a unit of the SSD, the unit being one of the SSD, a bus or channel shared by individual elements of the SSD, a bank of the SSD, and an individual element of the SSD.

30. The method of claim 23, further comprising:
sending an acknowledgement signal of the first write command to the host; and
sending a write completion signal of the first write command to the host.

* * * * *